Oct. 18, 1955    J. W. THOMAS    2,720,980
THERMAL DIFFUSION APPARATUS AND METHOD
Filed July 2, 1954
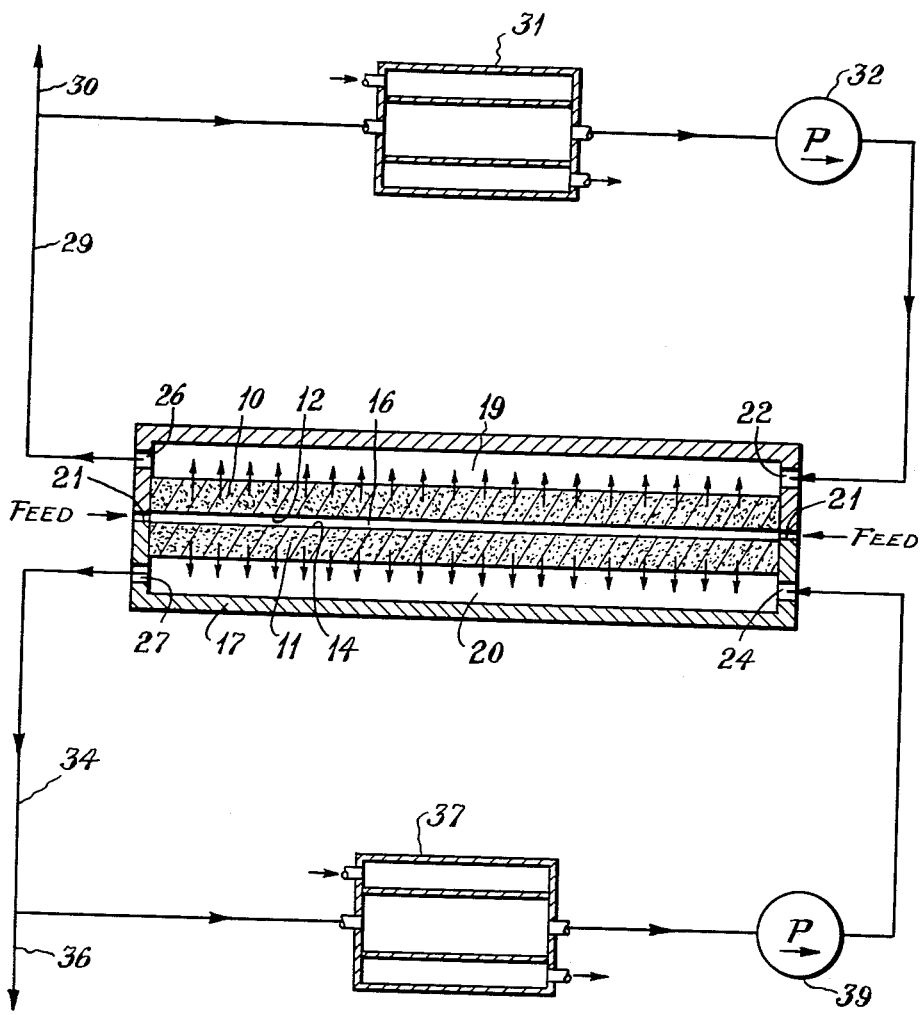
INVENTOR.
JOHN W. THOMAS
BY
Campbell, Brumbaugh, Free & Graves
ATTORNEYS United States Patent Office 2,720,980
Patented Oct. 18, 1955

2,720,980

THERMAL DIFFUSION APPARATUS AND METHOD

John W. Thomas, Cleveland, Ohio, assignor to The Standard Oil Company, Cleveland, Ohio, a corporation of Ohio Application July 2, 1954, Serial No. 440,901

6 Claims. (Cl. 210—52.5)

The present invention relates to improvements in apparatus for separating dissimilar materials in a liquid mixture by liquid thermal diffusion and to an improved liquid thermal diffusion process.

The art of separating liquid mixtures into two or more liquid fractions, e. g., a first fraction enriched in one component of the liquid mixture and a second fraction impoverished in said component or enriched in another, by imposing a temperature gradient across a thin layer or stream of the mixture, dates back almost one hundred years but remained largely a laboratory curiosity because of the extremely poor separations obtained. In recent years, however, interest has been revived in liquid thermal diffusion as a means of resolving a liquid mixture into two or more dissimilar fractions that are relatively enriched and impoverished in components that are extremely difficult, if not impossible, to separate by other means and to carry out such separations on a commercially feasible scale.

Liquid thermal diffusion is carried out in apparatus consisting essentially of two closely spaced walls defining a separation chamber. One of the opposed, chamber-forming walls is maintained at a temperature higher than the other in order to impose a temperature gradient across the liquid in the separation chamber. It is believed that energy of translation is imparted to the molecules in the liquid from the wall which is at the higher temperature, referred to herein as the "hot wall" or "relatively hot wall" and that this energy is reflected in a tendency of the molecules to move toward the opposite "cold wall" or "relatively cold wall." It is also believed that the tendency of different molecules in a liquid mixture to move toward opposite walls is dependent upon their difference in shape. If there is no difference in shape, then molecular weight is believed to be controlling. It has been observed, for example, that in the separation of compounds of approximately equal molecular weight, the more compact molecules such as those of the ring type, tend to move more readily from adjacent the hot wall toward the cold wall than do molecules of extended configuration, such as long chain aliphatics. On the basis of these and other observations, it is concluded that the imposition of a thermal gradient across a liquid mixture in a thermal diffusion separation chamber rapidly resolves the mixture, at least initially, into one having, as to a particular component, a concentration gradient across the thin layer or stream. Thus, for example, a thin layer or stream of a liquid mixture composed of, or containing, components H and C is rapidly stratified or resolved into an exterior or face stratum immediately adjacent the hot wall which has a maximum concentration of component H and a minimum concentration of component C, another exterior or face stratum immediately adjacent the opposite cold wall and having a maximum concentration of component C and a minimum concentration of component H, and one or more intermediate strata wherein the concentrations of component H become smaller as the distance from the hot wall increases, and vice versa. The exterior or face strata, i. e., the portions of the liquid immediately adjacent the hot and cold walls, are most dissimilar from one another in that they contain the highest concentrations of the separated materials.

Various proposals have heretofore been made for removing the separated materials that initially accumulate immediately adjacent the hot and cold walls. These proposals include moving the walls of the apparatus as well as moving the liquid material in the separation chamber between the walls and all involve a relative endwise, as distinguished from lateral, movement of the fractions or strata accumulated immediately adjacent the walls until they are withdrawn from the apparatus through appropriate outlets at one or both ends. For continuous thermal diffusion operations, the proposals for moving the liquid through the chamber rather than moving the walls have been considered most practicable and various end withdrawal flow patterns, primarily classifiable as concurrent or countercurrent and as horizontal or vertical, have been suggested for the purpose of facilitating and enhancing the actual withdrawal of the fractions separated within the apparatus. A concurrent flow pattern, which may be horizontal or vertical, is one in which the various strata of liquid mixture, in any given portion of the chamber, move in the same direction from the point of entry into the separation chamber to the points of withdrawal therefrom of the fractions separated. This would not exclude a flow pattern in which the liquid mixture and various strata move radially inward or outward or move in opposite directions from or to a common zone of entry or withdrawal, respectively. A countercurrent flow pattern, which may likewise be horizontal or vertical but is most often vertical, is one in which, in any given portion of the chamber, the flow of liquid adjacent one chamber-forming wall is in a direction opposite to that of the flow of liquid adjacent the other wall, both directions of flow being endwise of the chamber, and the points of withdrawal of the fractions are at opposite ends of the chamber. In static operations, i. e., those in which the separation chamber is filled with liquid mixture that is subjected to a temperature gradient for a preselected length of time, during which no liquid is introduced or withdrawn, the chamber may be vertical or horizontal and the different fractions may be withdrawn at the same or opposite ends.

These methods have in common the feature that the liquid mixture subjected to thermal diffusion in essence becomes divided into strata moving endwise, as distinguished from laterally, through the chamber, said streams being withdrawn at one end or opposite ends of the separation chamber through outlets that normally are remote from the inlet. All of the material in a given fraction must move endwise along at least half the length of the chamber before it is withdrawn. However, since the exterior or face stratum of liquid immediately adjacent one wall or the other moves much more slowly, due to surface friction, than intermediate strata that are more nearly midway between the chamber-forming walls, and such exterior stratum inherently possesses the highest concentration of one or the other desired dissimilar materials, it is apparent that a fraction as withdrawn from such apparatus is not truly representative of the separation actually obtained within the chamber because the material concentrated to a high degree in the slowly moving exterior or face stratum immediately adjacent the chamber-forming wall is in effect diluted by the more rapidly advancing and less concentrated material in the inner strata of the stream.

These observations have led to a conclusion that in order effectively to take advantage of the high degree of separation actually achieved rapidly within a thermal diffusion separation chamber, the most concentrated portions of the dissimilar fractions should be withdrawn from the chamber with a minimum of dilution by liquid mixture that has been resolved less completely into dissimilar components. The present invention is addressed to the problem of rapidly withdrawing only the most concentrated portions of the separated fractions within a thermal diffusion separation chamber and of accomplishing this objective while providing an efficient and effective means for maintaining across the thermal diffusion separation chamber a temperature gradient that is entirely adequate for efficient separation.

Generally, apparatus according to the present invention includes a pair of porous or liquid-permeable wall members having opposed faces which are smooth and substantially equidistantly spaced apart and form a narrow, separation chamber which may be plane or annular, depending upon the shapes of the wall members, the wall members being relatively heated and cooled by circulation of hot or cold liquid in contact with them to maintain a temperature differential across the chamber, thereby inducing separation of the components of the liquid for withdrawal through the porous walls. More particularly, the wall members may be of any desired shape, i. e., rectangular, circular, tubular, or the like. Conduit means are provided for introducing liquid into the separation chamber directly, i. e., endwise or radially and not through the pores of a porous wall member. Collection chambers are formed behind the porous wall members. The different fractions withdrawn from the separation chamber through the respective wall members are admixed, in the collection chambers, with liquids circulated therethrough for relatively heating one of the wall members and cooling the other wall member and so maintaining a temperature gradient across the separation chamber. Means are provided for separating the fractions from the liquids with which they are admixed in the collection chambers and for recycling the liquids to the collection chambers.

In a preferred embodiment of the apparatus, the porous, chamber-forming wall members are horizontal, the hot wall member being above the cold wall member. A liquid-impervious shell encloses the porous wall members to form an upper collection chamber above and behind the upper porous wall member and a lower collection chamber below and behind the lower porous wall member. Means are provided for recycling the hot or heating liquid from the upper collection chamber in back of the upper porous wall member to an external device for reheating it and then returning the liquid to that collection chamber. Similarly, means are provided for recycling the cold or cooling liquid from the lower collection chamber in back of the lower porous wall member to an external means for cooling the liquid and then returning it to the lower collection chamber. Inasmuch as the preferred embodiment of the method of the invention involves utilizing hot and cold liquids substantially similar to or identical with the dissimilar fractions withdrawn from the separation chamber through the upper and lower porous wall members respectively, the preferred embodiment of the apparatus also includes means for bleeding off portions of the recycled liquids, preferably between the collection chamber and the external heating or cooling means, as the case may be.

The rapidity and degree of separation of dissimilar components in a given liquid mixture are, with continuous, concurrent flow patterns as distinguished from continuous, countercurrent flow patterns and static operations, substantially independent of the spacing, per se, between the chamber-forming wall members of the separation chamber. The rate and degree of separation in continuous, concurrent flow patterns are, however, proportional to the temperature gradient, i. e., the difference between the hot and cold wall temperatures divided by the spacing between the separation chamber-forming wall members. Thus, for example, if the spacing is halved, the rate and degree of separation will remain the same if the temperature difference is likewise halved. If the temperature difference remains the same and the spacing is halved, the rate or the degree of separation will be doubled. The maximum temperature of the hot wall member is limited to the lowest boiling or decomposition temperature of the liquid mixture or any of its components, or of the heating liquid, under the conditions of operation. The minimum temperature of the cold wall is limited by the highest freezing temperature of the liquid mixture or any of its components, or of the cooling liquid. It is preferable, therefore, in order to impose a high temperature gradient across the mixture, to make the spacing between the chamber-forming wall members as small as possible. While separations are obtainable in continuous, concurrent flow methods when the spacing between the chamber-forming wall members is as great as about 0.5 inch, it is generally desirable, and in fact required in continuous countercurrent methods and in static methods in which countercurrent thermal circulation takes place, that the spacing be considerably smaller, i. e., of the order of about 0.15 inch or less, and preferably less than about 0.08 inch. Continuous, horizontal concurrent flow patterns are preferred.

The method of the present invention generally comprises heating and cooling, respectively, the opposed wall members of a thermal diffusion separation chamber by contacting the back of one of the wall members with a hot or heated liquid and contacting the other of the wall members with a cold or cooled liquid in order to maintain a temperature gradient across the separation chamber formed by the faces of the wall members. A liquid mixture, under somewhat higher pressure than either the heating or cooling liquids, is introduced directly into the separation chamber, i. e., without first passing through the pores of either of the porous walls. While this liquid mixture is in the chamber, it is resolved into two dissimilar fractions due to the thermal gradient across the chamber. One of these fractions accumulates preferentially closely adjacent the face of the relatively heated or hot wall member, enters its pores and passes through it, and becomes admixed with the hot or heated liquid. Another fraction accumulates preferentially adjacent the cold or relatively cool porous wall face, enters its pores and passes through that porous wall member, and becomes admixed with the cold or cooled liquid. The fraction admixed with the hot liquid is removed therefrom and thereafter the hot liquid is reheated and recycled before repeated contact heat exchange with the back of the hot wall member. Similarly, the fraction admixed with the cold liquid is separated therefrom and the cold liquid is recooled and thereupon recycled for repeated contact heat exchange with the cold porous wall member.

In the preferred embodiment of the method, the hot or heating liquid is similar to or identical with the fraction that is admixed with it after passing through the hot porous wall and the cold or cooling liquid is similar to or identical with the fraction that is admixed with it after passing through the cold porous wall. When the method is practiced in this manner, portions of the liquids that are circulated from contact with the wall members and subjected to reheating and recooling, respectively, are simply bled off.

The porous wall members should, for optimum heat conductivity, minimum turbulence in the separation chamber, and most uniform product withdrawal, have relatively small and uniformly distributed pores and be of a material, preferably metal, that is inert to the liquid mixture, its components and heating and cooling liquids under the conditions of operation. It is to be understood that departures from the preferred construction of the apparatus with reference to size and uniformity of distribution of the pores, heat conductivity, inertness, and the like, would reduce the efficiency of the apparatus and, if carried too far, render it inoperable.

The method of the present invention is adaptable to flow patterns and static operations in which the separation chamber may be horizontal or vertical as well as to methods, such as described in application Serial No. 218,944 of Jones and Milberger, filed April 3, 1951, involving the use of a liquid-permeable membrane parallel to and supported between the chamber-forming walls. The method is preferably applied to continuous, horizontal and concurrent flow patterns.

The primary advantage of the apparatus and method of the invention is that it takes cognizance of the rapidity with which separation by thermal diffusion actually takes place within a thermal diffusion chamber in that the outer strata of the liquid stream are continually removed from the stream as rapidly as they are formed and without requiring any portion of the liquid to move along the length of a separation chamber in a plane closely adjacent one wall or the other of the separation chamber and without being diluted with less concentrated portions of the liquid. In addition, the method and apparatus have the advantage of providing an effective means of relatively heating and cooling the porous wall members without introducing barriers to the flow of the separated fractions through the wall members.

These and other advantages, as well as the utility of the invention, will be further described with reference to the accompanying drawing, wherein:

The sole figure is a schematic view of one preferred embodiment of the apparatus.

The thermal diffusion apparatus illustrated in the drawing consists essentially of two porous or liquid-permeable wall members 10 and 11, the faces 12 and 14 of which are spaced apart to form a uniformly narrow separation chamber 16. The porous wall members 10 and 11 are enclosed by a liquid-impermeable shell 17 forming collection chambers 19 and 20 behind porous wall members 10 and 11 respectively. The shell 17, which may be rectangular, circular or any desired shape, is provided with one or more inlets 21 for liquid mixture connecting directly with the separation chamber 16, as well as with inlets 22 and 24 and outlets 26 and 27 connecting with the collection chambers 19 and 20.

The outlet 26 for the collection chamber 19 is connected to the inlet 22 by way of a line 29 provided with a bleed-off line 30, a heat exchanger 31 and a recirculating pump 32. Similarly, the outlet 27 for the collection chamber 20 is connected to the inlet 24 by way of a line 34 provided with a bleed-off line 36, a heat exchanger 37 and a recirculating pump 39.

In operation, a liquid mixture separable by thermal diffusion into fractions H and C, H being used for convenience to designate the fraction which will accumulate adjacent the hot wall and C being used for convience to designate the fraction that will tend to accumulate adjacent the cold wall, is continuously introduced into the separation chamber 16 by way of inlet 21. A first liquid, preferably a previously separated fraction H, heated to and maintained at an elevated temperature as high as possible but below the boiling point or decomposition temperature of the liquid by the heat exchanger 31, is circulated through collection chamber 19 by way of line 29 and circulating pump 32. A second liquid, preferably a previously separated fraction C, cooled by the heat exchanger 37 to a temperature as low as possible without however reaching the freezing, congealing or crystallization temperature or unduly increasing its viscosity, is continuously circulated through the collection chamber 20 by way of line 34 and circulating pump 39.

The circulation of the first and second liquids through the collection chambers 19 and 20 is in direct contact with the porous wall members 10 and 11, which are preferably of a highly heat conductive and inert metal. The porous wall member 10 conducts heat from the first liquid to the wall face 12 and the porous wall member 11 conducts heat from the wall face 14 to the second liquid to create a temperature gradient across the liquid mixture in the separation chamber 16. This results in rapidly stratifying the liquid mixture and imparting to it a concentration gradient in which component H is at a maximum immediately adjacent the hot wall face 12 and the component C is at a maximum immediately adjacent the cold wall face 14. The concentrated strata H and C accumulating adjacent the opposed wall faces are forced, by the pressure of new liquid mixture entering through the inlet 21, to pass through the porous wall members 10 and 11 to become mixed with the recirculating hot and cold liquids in the collection chambers 19 and 20. The mixture of fraction H and hot liquid leaves the collection chamber 19 by way of outlet 26 and line 29 and a portion of the mixture is continuously withdrawn by way of bleed-off line 30. Similarly, a mixture of fraction C and cold liquid leaves the collection chamber 20 by way of outlet 27 and line 34, a portion thereof being continuously withdrawn by way of bleed-off line 36.

It will become apparent that when the hot and cold recirculated liquids are similar to or identical with fractions H and C respectively, it will be sufficient merely to bleed off fractions H and C by way of bleed-off lines 30 and 36, respectively, at a rate approximately equal to the rate of feed of liquid mixture through inlet 21 in order to keep the volume of recirculating liquids substantially constant. If, on the other hand, the hot and cold liquids are substantially different from fractions H and C, means may be provided for separating fractions H and C respectively from the mixtures thereof with hot and cold liquid and returning the hot and cold liquid to the respective heat exchangers for further circulation.

It is to be understood that many modifications will readily occur to those skilled in the art upon reading this description. All such modifications are intended to be included within the scope of the invention as defined in the accompanying claims.

I claim:

1. Liquid thermal diffusion apparatus for separating a liquid mixture into dissimilar liquid fractions comprising two porous wall members closely and substantially equidistantly spaced from one another to form a narrow separation chamber, means for introducing liquid mixture directly into said separation chamber, first and second collection chambers behind said wall members, means for continuously introducing into said first collection chamber a relatively hot liquid for contact heat exchange with one porous wall member and for admixing with a first fraction withdrawn laterally and continuously from the separation chamber through said one porous wall member, means for continuously withdrawing the admixed relatively hot liquid and first fraction from the first collection chamber, means for continuously introducing into the second collection chamber a relatively cold liquid for contact heat exchange with the other of the porous wall members and for admixing with a second fraction withdrawn continuously and laterally from the separation chamber through said other porous wall member, and means for continuously withdrawing the admixed relatively cold liquid and second fraction from the second collection chamber.

2. Liquid thermal diffusion apparatus for separating a liquid mixture into dissimilar liquid fractions comprising two substantially parallel, porous wall members closely spaced from one another to form a narrow separation chamber, means for introducing liquid mixture directly into said separation chamber, a liquid impervious shell enclosing said porous wall members and forming first and second collection chambers behind said wall members, means for continuously introducing into said first collection chamber a relatively hot liquid for contact heat exchange with one porous wall member and for admixing with a first fraction withdrawn laterally and continuously from the separation chamber through said one porous wall member, means for continuously withdrawing the admixed relatively hot liquid and first fraction from the first collection chamber, means for continuously introducing into the second collection chamber a relatively cold liquid for contact heat exchange with the other of the porous wall members and for admixing with a second fraction withdrawn continuously and laterally from the separation chamber through said other porous wall member, and means for continuously withdrawing the admixed relatively cold liquid and second fraction from the second collection chamber.

3. Liquid thermal diffusion apparatus for separating a liquid mixture into dissimilar liquid fractions comprising two horizontal, substantially parallel, porous wall members closely spaced from one another to form a shallow separation chamber, means for introducing liquid mixture directly into said separation chamber, a liquid impervious shell enclosing said porous wall members and forming an upper collection chamber above the upper porous wall member and a lower collection chamber below the lower porous wall member, means for continuously introducing into the upper collection chamber a relatively hot liquid for contact heat exchange with the upper porous wall member and for admixing with a first fraction withdrawn laterally and continuously from the separation chamber through the upper porous wall member, means for continuously removing the admixed relatively hot liquid and first fraction from the upper collection chamber, removing at least a portion of the first fraction from said mixture and reheating the remainder before recycling to the upper collection chamber, means for continuously introducing into the lower collection chamber a relatively cold liquid for contact heat exchange with the lower wall member and for admixing with a second fraction withdrawn continuously and laterally from the separation chamber through said lower porous wall member, means for continuously removing the admixed relatively cold liquid and second fraction from the lower collection chamber and means for continuously separating from said mixture at least a portion of said second fraction and again cooling the remainder thereof before recycling to the lower collection chamber.

4. A method for continuously separating the dissimilar components in a liquid mixture by thermal diffusion which comprises continuously introducing a liquid mixture containing said components into a narrow separation chamber formed by closely spaced, opposed faces of porous wall members, contacting the back of one porous wall member with a relatively hot liquid for maintaining said wall member at a relatively high temperature, contacting the back of the other porous wall member with a relatively cold liquid for maintaining a temperature gradient across the liquid mixture in the separation chamber, continuously and laterally withdrawing through one wall member a first fraction accumulating adjacent the chamber-forming face of said one wall member for admixture with the relatively hot liquid, continuously and laterally withdrawing through the other wall member a second fraction accumulating adjacent the chamber-forming face of said other wall member for admixture with said relatively cold liquid, and continuously separating first and second fractions from said relatively hot and cold liquids.

5. A method for continuously separating the dissimilar components in a liquid mixture by thermal diffusion which comprises continuously introducing a liquid mixture containing said components into a shallow, horizontal separation chamber formed by closely spaced upper and lower porous wall members, continuously circulating and reheating a first liquid in heat exchange contact with the upper liquid-pervious wall for maintaining said wall at a relatively high temperature, continuously recirculating and cooling a second liquid in heat exchange contact with the lower liquid-pervious wall for maintaining a temperature gradient across the liquid mixture in the separation chamber, continuously and laterally withdrawing through the upper wall member a first fraction accumulating adjacent the chamber-forming face of the upper wall member for admixture with said first liquid, continuously and laterally withdrawing through the lower wall member a second fraction accumulating adjacent the chamber-forming face of the lower wall member for admixture with said second liquid, and continuously separating said first and second fractions from said recirculated first and second heat exchange liquids.

6. In a method for separating the dissimilar components in a liquid mixture by thermal diffusion which comprises continuously introducing a liquid mixture containing said components into a narrow separation chamber formed by closely spaced, opposed faces of porous wall members, maintaining a temperature gradient across the liquid mixture in the separation chamber, withdrawing through one wall member a first fraction accumulating adjacent the chamber-forming face of said one wall member, and withdrawing through the other wall member a second fraction accumulating adjacent the chamber-forming face of the other member, the improvement which comprises maintaining the temperature gradient across the liquid mixture in the separation chamber by heating a first liquid in contact with the back of one member for maintaining said wall member at a relatively high temperature and cooling a second liquid in heat exchange contact with the back of the other wall member for maintaining said other wall member at a relatively low temperature.

References Cited in the file of this patent

UNITED STATES PATENTS

| | | |
|---|---|---|
| 2,521,112 | Beams | Sept. 5, 1950 |
| 2,541,071 | Jones et al. | Feb. 13, 1951 |
| 2,584,785 | Bowman | Feb. 5, 1952 |
| 2,585,244 | Hanson | Feb. 12, 1952 |
| 2,609,059 | Benedict | Sept. 2, 1952 |
| 2,688,404 | Wahl | Sept. 7, 1954 |